(12) United States Patent
Huggins et al.

(10) Patent No.: US 11,312,122 B2
(45) Date of Patent: Apr. 26, 2022

(54) LIQUID CRYSTAL CELL ASSEMBLY DEVICE

(71) Applicant: Flexenable Limited, Cambridge (GB)

(72) Inventors: Jonathan Huggins, Cambridge (GB); Francesca Bottacchi, Cambridge (GB)

(73) Assignee: Flexenable Limited, Cambridge (GB)

( * ) Notice: Subject to any disclaimer, the term of this patent is extended or adjusted under 35 U.S.C. 154(b) by 5 days.

(21) Appl. No.: 17/084,904

(22) Filed: Oct. 30, 2020

(65) Prior Publication Data
US 2021/0129514 A1 May 6, 2021

(30) Foreign Application Priority Data
Oct. 31, 2019 (GB) ..................... 1915823

(51) Int. Cl.
| | |
|---|---|
| *B41F 19/06* | (2006.01) |
| *B32B 37/06* | (2006.01) |
| *G02F 1/1335* | (2006.01) |
| *G02F 1/13* | (2006.01) |
| *B32B 27/08* | (2006.01) |
| *B32B 7/12* | (2006.01) |

(52) U.S. Cl.
CPC ............... *B32B 37/06* (2013.01); *B32B 7/12* (2013.01); *B32B 27/08* (2013.01); *G02F 1/1303* (2013.01); *G02F 1/133528* (2013.01); *B32B 2307/42* (2013.01); *B32B 2307/7246* (2013.01); *B32B 2457/202* (2013.01)

(58) Field of Classification Search
CPC ............ B32B 37/06; B32B 2307/7246; B32B 2457/202; B32B 7/12; B32B 27/08; B32B 2307/42; G02F 2202/28; G02F 1/133528; G02F 1/1303; G02B 1/14
See application file for complete search history.

(56) References Cited

U.S. PATENT DOCUMENTS

2011/0249223 A1* 10/2011 Suh .................... G02F 1/133528
349/96
2020/0341323 A1* 10/2020 Reeves ............... G02F 1/13338

FOREIGN PATENT DOCUMENTS

WO WO-2020070326 A1 * 4/2020 .............. A61M 5/20

* cited by examiner

*Primary Examiner* — Vishal I Patel
(74) *Attorney, Agent, or Firm* — Dergosits & Noah LLP; Todd A. Noah

(57) ABSTRACT

A method comprising: subjecting at least one or more barrier film components and one or more polariser film components for a liquid crystal display device to a first drying process; thereafter combining at least said barrier film components and polariser components to assemble upper and lower sub-assembly components; subjecting the upper and lower sub-assembly components to a second drying process; and thereafter combining the upper and lower sub-assembly components with at least a liquid crystal cell component to assemble a liquid crystal device.

6 Claims, 4 Drawing Sheets

LIQUID CRYSTAL CELL ASSEMBLY DEVICE

CLAIM OF PRIORITY

This application claims priority to Great Britain Patent Application No. 1915823.7, filed Oct. 31, 2019, the content of which is hereby incorporated by reference in its entirety.

FIELD OF THE INVENTION

A liquid crystal device may be assembled from a plurality of pre-prepared components, including a liquid crystal cell, one or more polariser components and one or more barrier film components.

The inventors for the present application have worked on developing the production of liquid crystal devices from polymer film components (components including one or more organic polymer films as support films). In particular, the inventors for the present application have worked on an assembly technique involving combining at least barrier film components and polariser components to form sub-assembly components, before combining these sub-assembly components with at least the liquid crystal cell to assemble the liquid crystal device. The inventors have identified the problem of bubbles appearing within the assembled device under high temperature storage conditions, even after drying these sub-assembly components and the liquid crystal cell (and any other assembly components) immediately before combination to assemble the liquid crystal device.

One aim of the present invention is to develop a new assembly technique that better prevents the appearance of bubbles under high temperature storage conditions.

There is hereby provided a method comprising: subjecting at least one or more barrier film components and one or more polariser film components for a liquid crystal display device to a first drying process; thereafter combining at least said barrier film components and polariser components to assemble upper and lower sub-assembly components; subjecting the upper and lower sub-assembly components to a second drying process; and thereafter combining the upper and lower sub-assembly components with at least a liquid crystal cell component to assemble a liquid crystal device.

According to one embodiment, the first drying process comprises either (i) baking the barrier film components and polariser components in an atmospheric pressure environment whose water vapour content has been reduced; and/or (ii) keeping the barrier film components and polariser components in a reduced pressure environment.

According to one embodiment, the second drying process comprises either (i) baking the sub-assembly components in an atmospheric pressure environment whose water vapour content has been reduced; and/or (ii) keeping the sub-assembly components in a reduced pressure environment.

According to one embodiment, each of the upper and lower sub-assembly components comprises, between a stretched polymer dichroic film and one or more barrier coatings, at least one polymer film having a higher water vapour transmission rate (WVTR) than both the stretched polymer dichroic film and the one or more barrier coatings.

According to one embodiment, said at least one high WVTR film comprises one or more of: a support film supporting said one or more barrier coatings of a barrier film component; a support film supporting the stretched polymer dichroic film of a polariser component; and an adhesive film between the barrier film component and the polariser component.

According to one embodiment, the atmospheric pressure environment whose water vapour content has been reduced has a relative humidity of about 0%.

BRIEF DESCRIPTION OF THE FIGURES

An example embodiment is described in detail hereunder, by way of example only, with reference to the accompanying drawings, in which.

DETAILED DESCRIPTION

In one example embodiment, the technique is used for the production of an organic liquid crystal display (OLCD) device, which comprises an organic transistor device (such as an organic thin film transistor (OTFT) device) for the control component. OTFTs comprise an organic semiconductor (such as e.g., an organic polymer or small-molecule semiconductor) for the semiconductor channels. The technique is also applicable to the production of other kinds of liquid crystal display devices, and to the production of liquid crystal devices other than display devices such as e.g., adaptive lenses.

Figure 1:
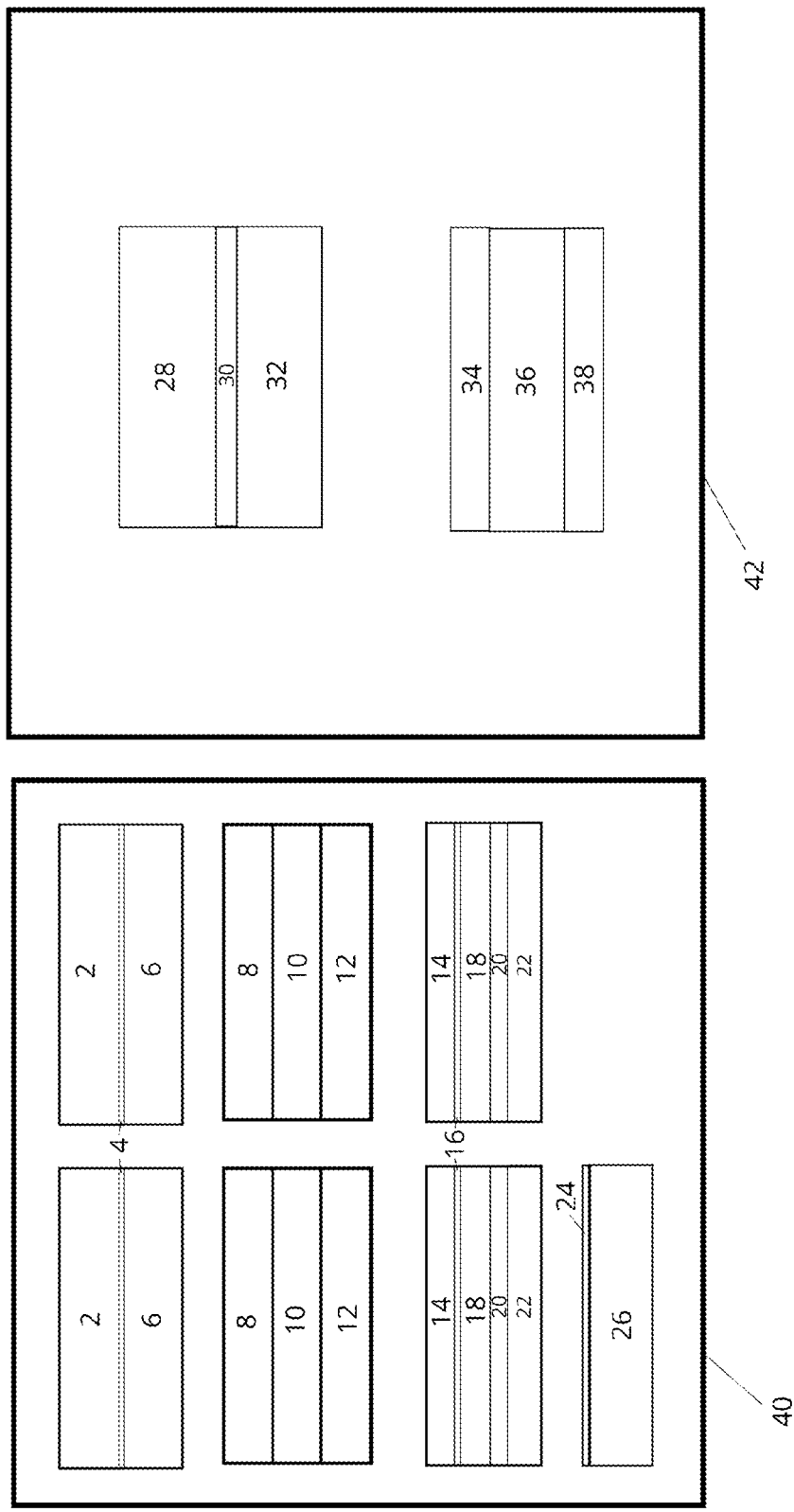
FIGS. 1-4 illustrate respective subsequent stages of an example assembly technique.

With reference to FIG. 1, the description of an assembly process according to an example embodiment of the present invention begins with storing the barrier film components, polariser components, and an electrostatic discharge (ESD) film component for at least about 12 hours in a reduced pressure environment created by pumping down a vacuum chamber 40 to a pressure of about 3 Pa or less. In this example, each barrier film component comprises a thin flexible polymer support film 2 (e.g., polyethylene terephthalate (PET)) coated on one side with a stack of barrier layers 4 (e.g., metal oxide layers and non-halogenated cross-linked resin layers). The barrier film component also comprises a peelable adhesive premask 6 applied to the side of the film with the barrier coatings, to facilitate handling of the barrier film component. In this example, each polariser component comprises a stretched polymer dichroic film 16 (e.g., highly uniaxially-stretched polyvinylalcohol (PVA) film doped with iodine species) bonded on both sides to optically neutral polymer support films 14, 18 (e.g., cellulose triacetate (TAC) films)). One of the two polymer support films 14, 18 is coated with adhesive 20, and the coated adhesive surface is protected by a release liner 22. In this example, the ESD protection film component comprises an optically neutral polymer support film 26 (e.g., cellulose triacetate (TAC) film), and a layer of electrically conductive material 24 (such as a conductive metal oxide such as indium-tin-oxide (ITO)) formed in situ on the polymer support film.

As shown in FIG. 1, the liquid crystal cell and an optically clear adhesive (OCA) film component are baked for about 12 hours at about 80 degrees Centigrade in a dry air oven 42. In this example, the relative humidity in the dry air oven is about 0%. The OCA film component comprises an optically neutral polymer film 36 having adhesive surfaces on both sides which are protected by respective release liners 34, 38. In this example, the liquid crystal cell comprises LC material 30 contained between two half-cell components 28, 32 bonded together. One half-cell 32 comprises a control component comprising an optically neutral, polymer support film (e.g., TAC film), and a stack of layers formed in situ on the polymer support film. The stack of layers defines an array of pixel electrodes in the active display area and electrical circuitry (e.g., active matrix circuitry) for independently addressing each pixel electrode via conductors outside the active display area. The stack of layers also defines a liquid crystal alignment surface at the top of the stack. In this example, the stack includes an organic polymer semiconductor layer, which provides the semiconductor channels for an array of transistors forming part of the active matrix circuitry. The other half-cell 28 comprises an optically neutral, polymer support film supporting at least a liquid crystal alignment layer providing a liquid crystal alignment surface to interface with the liquid crystal material. For the example of a colour display device, the other half-cell may also, e.g., comprise a stack of layers (between the support film and the liquid crystal alignment layer) defining an array of colour filters (CFA) in a black matrix, but another option is for the CFA to be part of the control component half-cell. The two liquid crystal alignment surfaces interface with the liquid crystal material 30 in the completed device, and control the orientation of the liquid crystal molecules (director of the liquid crystal material) in each pixel region in the absence of an overriding electric field generated between the respective pixel electrode and a counter electrode (which counter electrode may be part of the control component half-cell or part of the counter component half-cell). A required thickness of liquid crystal material is achieved uniformly across the active display area by the use of (a) an ordered array of photospacer structures defined by the stack of the control component half-cell 32 and/or the stack of the counter component half-cell 28, and/or (b) a random scattering of pre-prepared spacer elements (spacer balls/beads/fibres) between the liquid crystal alignment surfaces.

Figure 2:
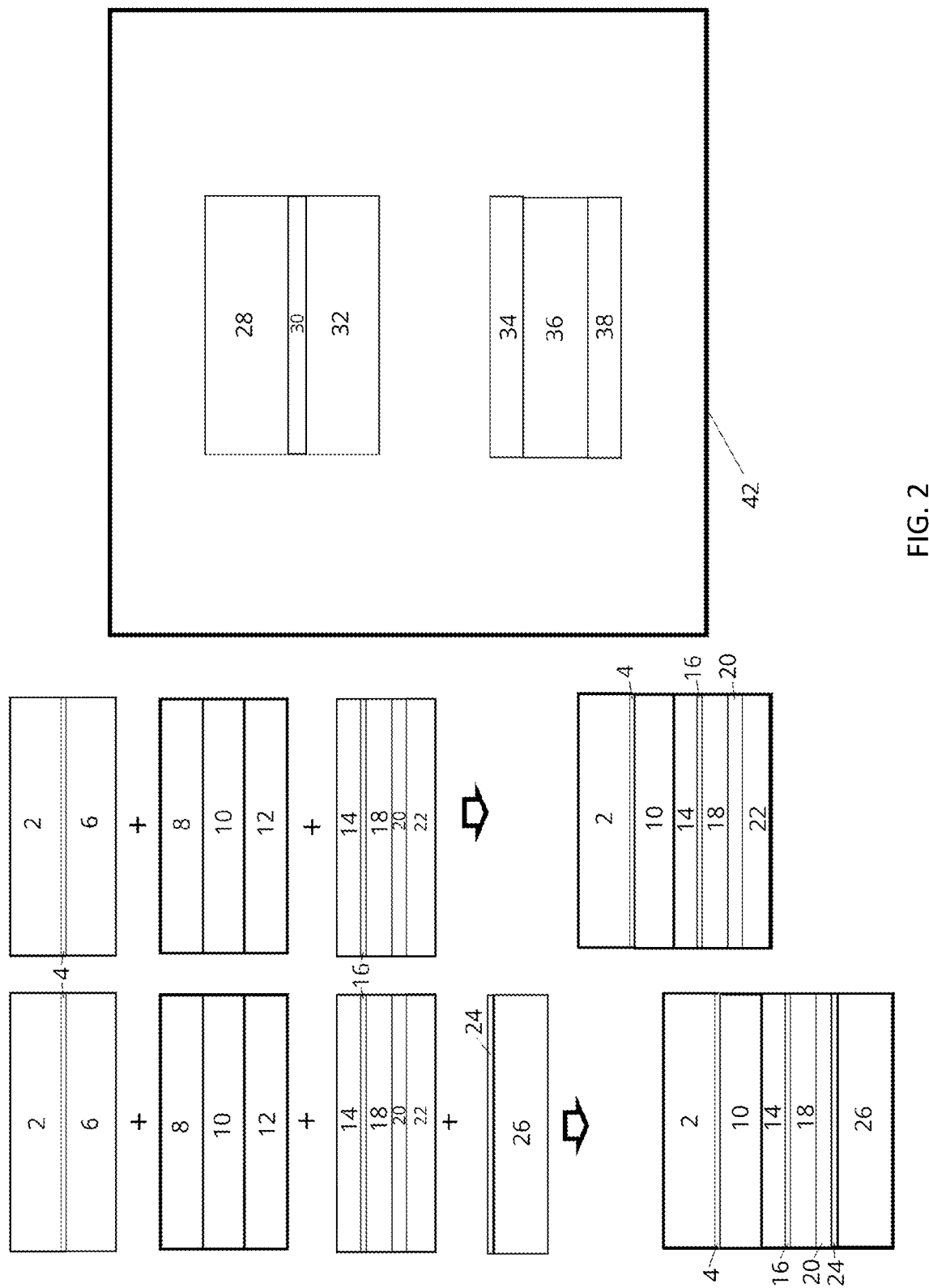

With reference to FIG. 2, after storing the above-mentioned components in the pumped-down vacuum chamber 40, the components are removed from the vacuum chamber 40 and combined together in an atmospheric pressure clean room environment (outside of the vacuum chamber 40 and outside of the dry air oven 42) to form upper and lower sub-assembly components. For the upper sub-assembly component, the assembly operations comprise the following. The release liner 22 is removed from the polariser film component, and the exposed adhesive surface is applied to the ESD protection film component. A releaser liner 12 is removed from one side of the OCA film component to expose an adhesive surface of the OCA film component, and this adhesive surface is applied to the remaining free surface of the polariser film component. The premask 6 is removed from the barrier film component to expose the barrier coatings 4. The remaining release liner 8 is removed from the OCA film component (now combined with the polariser film component and the ESD protection film component), and the exposed adhesive surface is applied to the barrier film component, on the side of the barrier coatings.

This operation is repeated for the lower sub-assembly component, except that no ESD protection film component is bonded to the polariser film component. The release liner 22 of the polariser film component remains in place for the next drying process, described below.

In this example, the term "upper" is used to denote the side of the liquid crystal cell closer to the viewing surface of the display device; and the term "lower" is used to denote the side of the liquid crystal cell farther from the viewing surface of the display device.

Figure 3:
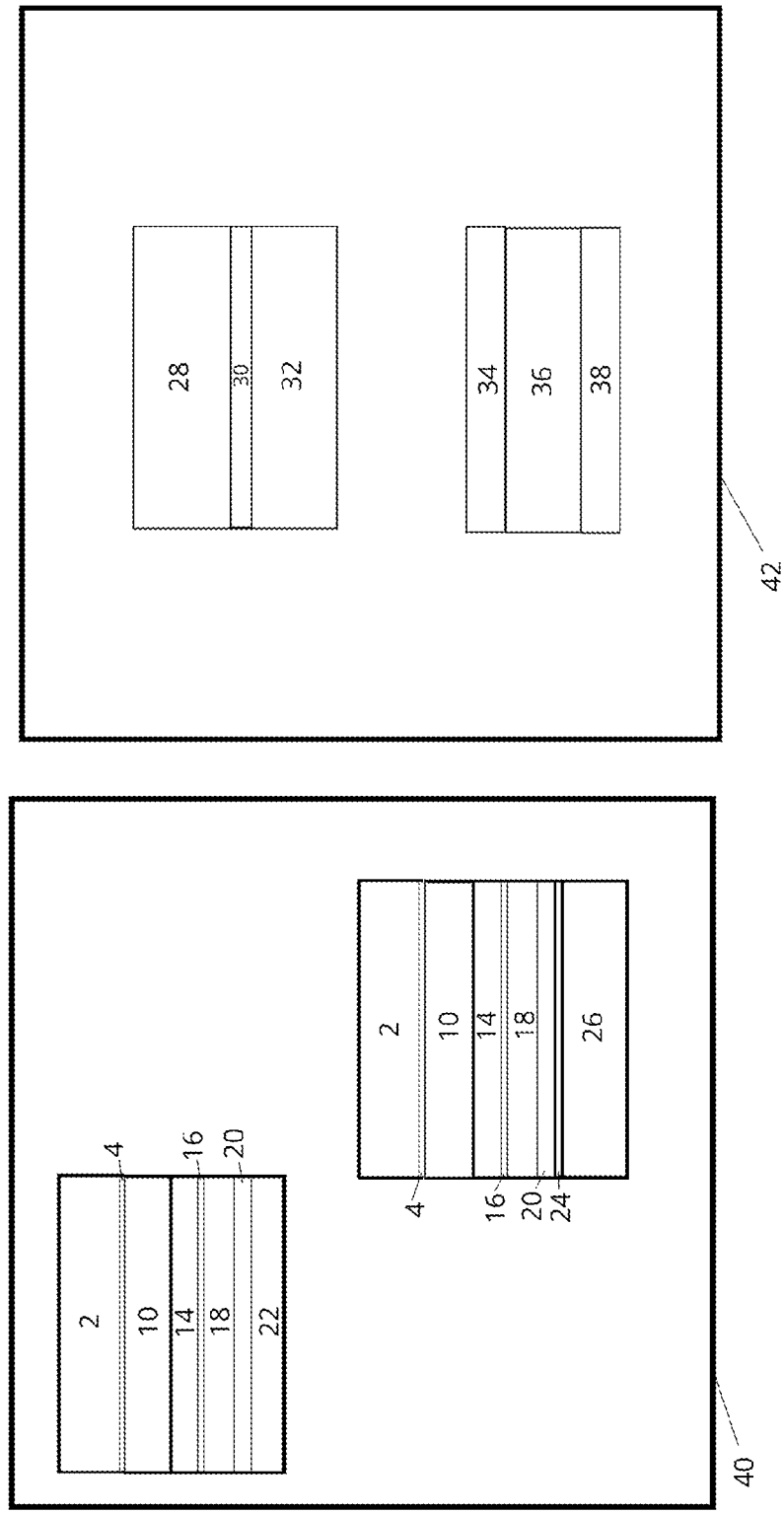

With reference to FIG. 3, the lower and upper sub-assembly components are returned to the vacuum chamber 40 and stored at a reduced pressure in the pumped-down vacuum chamber 40 for at least about 12 hours.

Figure 4:
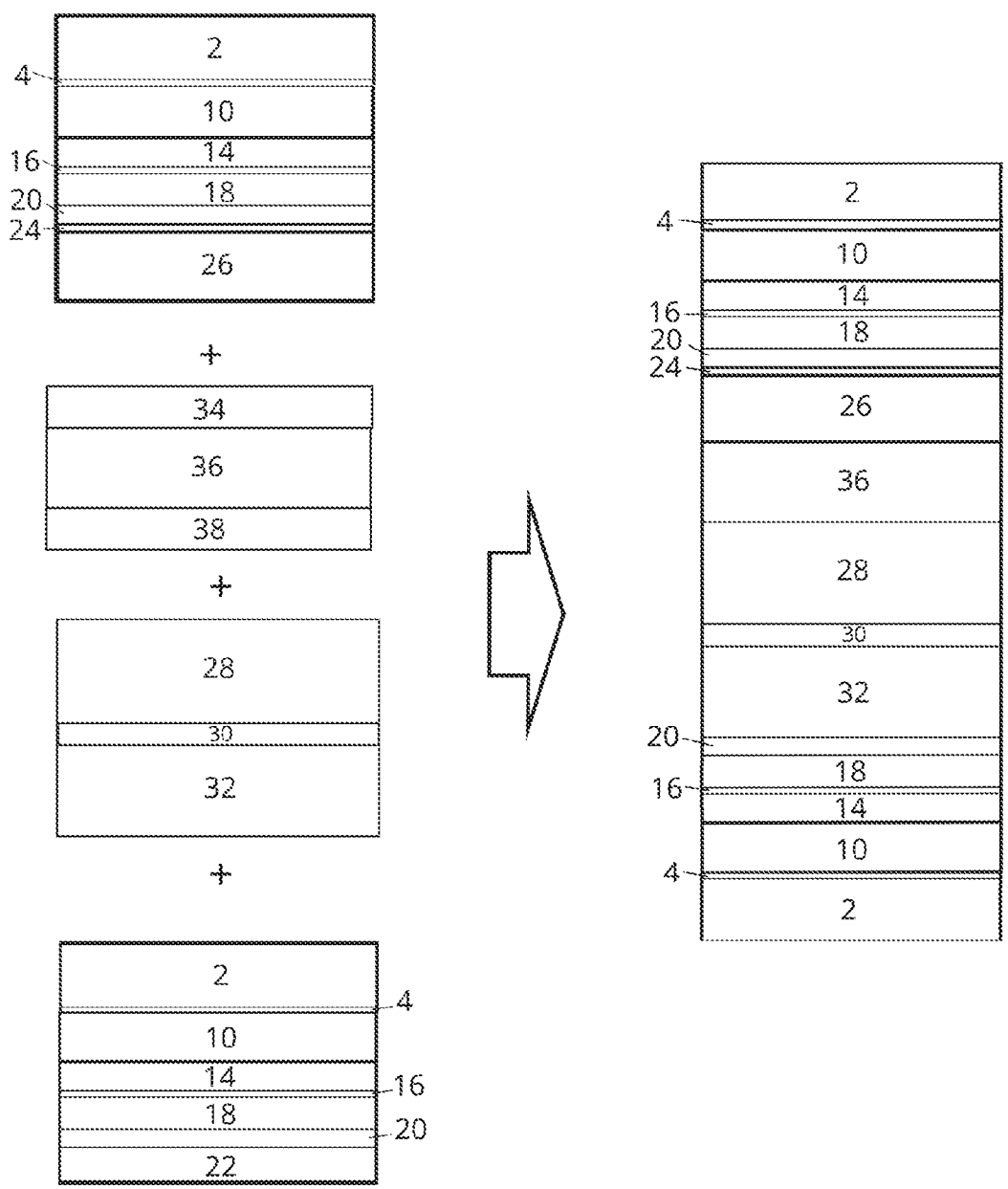

With reference to FIG. 4, the vacuum-dried upper and lower sub-assembly components are removed from the vacuum chamber 40, and the dry-baked liquid crystal cell and OCA film component are removed from the dry air oven 42. The upper and lower sub-assembly components are combined with the liquid crystal cell and OCA film component outside the dry air oven and vacuum chamber in a clean room (atmospheric pressure environment with a reduced level of air-borne particulates). This combination comprises the following operations. The release liner 22 is removed from the polariser component of the lower sub-assembly component, and the exposed adhesive surface of the polariser component is applied to the liquid crystal cell on the side of the control component half-cell 32. One of the release liners 34 is removed from the dry-baked OCA film component, and the exposed adhesive surface is applied to the free surface of the ESD protection film component of the upper sub-assembly component. The remaining release liner 38 is removed from the other side of the OCA film component (now combined with the upper sub-assembly component), and the exposed adhesive surface is applied to the liquid crystal cell on the side of the counter component half-cell 28.

In contrast to the OCA film component between the polariser component and the barrier film component in the upper sub-assembly component, the OCA film component between the liquid crystal cell and the polariser component in the assembled liquid crystal device is dried by baking in a dry air oven 42 instead of by vacuum drying in the pumped-down vacuum chamber 40. As described in co-pending Great Britain Patent Application No. 1807166.2, and co-pending International Patent Application No. PCT/EP2019/061104, this is found to reduce the occurrence during high temperature storage testing (operation of the device after storage at about 80 degrees Centigrade) of the appearance in the all-white-driven display area of blackening/greying of the kind that is attributable to a degradation of the organic semiconductor.

The resulting liquid crystal display device is observed to exhibit less bubbling in high temperature storage tests than a liquid crystal device produced by the same method but without storing the individual components (barrier film components and polariser film components) in a pumped down vacuum chamber before forming the upper and lower sub-assembly components. Without wishing to be bound by theory, the inventors for the present application attribute this reduction in bubbling to better degassing (reduction in the moisture content) of the polymer support films between the barrier coatings of the barrier film component and the stretched polymer film of the polariser film component. In this connection, it is noted that the stretched polymer active film of the polariser component is found to exhibit a low water vapour transmission rate (WVTR) comparable to that of the barrier coatings of the barrier film component, and much lower than the polymer support films between the barrier coatings and the stretched polymer active film.

The liquid crystal display device may comprise additional components other than those specifically mentioned above. For example, the liquid crystal display device may incorporate an additional dry-baked OCA film component between the liquid crystal cell and the lower polariser component.

An example embodiment is described above for the production of a single liquid crystal display device. However, the technique is also applicable to the production of a set of liquid crystal display devices from wide area components. One example mass production method comprises: (a)

drying wide-area polariser components, wide-area ESD film components and wide-area barrier film components according to the drying method described above; (b) combining these dried wide-area components into wide-area sub-assembly components, according to the assembly method described above; (c) dividing the wide-area sub-assembly components into individual sub-assembly components; (d) drying the individual sub-assembly components according to the drying method described above; and (e) thereafter combining the individual sub-assembly components with a set of liquid crystal cells, according to the assembly method described above, to create a set of liquid crystal display devices.

As mentioned above, examples of techniques according to the present invention have been described in detail above with reference to specific process details, but the technique is more widely applicable within the general teaching of the present application. Additionally, and in accordance with the general teaching of the present invention, a technique according to the present invention may include additional process steps not described above, and/or omit some of the process steps described above.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

What is claimed is:

1. A method comprising:
    subjecting at least one or more barrier film components and one or more polariser film components for a liquid crystal display device to a first drying process;
    thereafter combining at least the barrier film components and polariser components to assemble upper and lower sub-assembly components;
    subjecting the upper and lower sub-assembly components to a second drying process; and
    thereafter combining the upper and lower sub-assembly components with at least a liquid crystal cell component to assemble a liquid crystal device.

2. The method according to claim 1, wherein the first drying process comprises either (i) baking the barrier film components and polariser components in an atmospheric pressure environment whose water vapour content has been reduced; and/or (ii) keeping the barrier film components and polariser components in a reduced pressure environment.

3. The method according to claim 1, wherein the second drying process comprises either (i) baking the sub-assembly components in an atmospheric pressure environment whose water vapour content has been reduced; and/or (ii) keeping the sub-assembly components in a reduced pressure environment.

4. The method according to claim 1, wherein: each of the upper and lower sub-assembly components comprises, between a stretched polymer dichroic film and one or more barrier coatings, at least one polymer film having a higher water vapour transmission rate (WVTR) than both the stretched polymer dichroic film and the one or more barrier coatings.

5. The method according to claim 4, wherein the at least one high WVTR film comprises one or more of:
    a support film supporting the one or more barrier coatings of a barrier film component;
    a support film supporting the stretched polymer dichroic film of a polariser component; and
    an adhesive film between the barrier film component and the polariser component.

6. The method according to claim 2, wherein the atmospheric pressure environment whose water vapour content has been reduced has a relative humidity of about 0%.

* * * * *